United States Patent
Gongloff et al.

(10) Patent No.: US 12,377,795 B2
(45) Date of Patent: Aug. 5, 2025

(54) TOOLBAR SYSTEMS

(71) Applicant: Diamondback Automotive Accessories, Inc., Philipsburg, PA (US)

(72) Inventors: Daniel J. Gongloff, Ashville, PA (US); Brandon Jacob Moist, Hummelstown, PA (US)

(73) Assignee: Diamondback Automotive Accessories, Inc., Philipsburg, PA (US)

( * ) Notice: Subject to any disclaimer, the term of this patent is extended or adjusted under 35 U.S.C. 154(b) by 242 days.

(21) Appl. No.: 17/852,271

(22) Filed: Jun. 28, 2022

(65) Prior Publication Data

US 2022/0410817 A1    Dec. 29, 2022

Related U.S. Application Data (60) Provisional application No. 63/215,746, filed on Jun. 28, 2021.

(51) Int. Cl.
| | | |
|---|---|---|
| *B60R 11/06* | (2006.01) | |
| *B60R 9/06* | (2006.01) | |
| *F16B 23/00* | (2006.01) | |

(52) U.S. Cl.
CPC ........... *B60R 11/06* (2013.01); *B60R 9/06* (2013.01); *F16B 23/00* (2013.01)

(58) Field of Classification Search
CPC ............ B60R 9/06; B60R 11/06; F16B 23/00
USPC ......................................................... 224/311
See application file for complete search history.

(56) References Cited

U.S. PATENT DOCUMENTS

| | | | | |
|---|---|---|---|---|
| 4,772,165 | A * | 9/1988 | Bartkus | B60P 7/15 410/139 |
| 5,207,470 | A * | 5/1993 | Rafi-Zadeh | B60J 7/1614 296/156 |
| 5,372,289 | A * | 12/1994 | Dachicourt | B60R 7/02 224/538 |
| 5,484,092 | A * | 1/1996 | Cheney | B60R 9/00 312/222 |
| 6,513,851 | B2 * | 2/2003 | Henderson | B60R 5/044 296/100.06 |
| 6,572,168 | B1 * | 6/2003 | Radstake | B60R 7/04 312/246 |
| 6,585,309 | B2 * | 7/2003 | Dicke | B60R 11/06 296/100.1 |
| 6,585,465 | B1 * | 7/2003 | Hammond | B60R 7/02 410/104 |
| 6,598,930 | B1 | 7/2003 | Tilton | |
| 6,607,229 | B1 * | 8/2003 | McIntosh | B60J 7/1621 296/26.06 |
| 6,712,422 | B1 * | 3/2004 | Vaillancourt | B60P 3/341 296/170 |

(Continued)

*Primary Examiner* — Peter N Helvey
(74) *Attorney, Agent, or Firm* — Alan G. Towner; Leech Tishman Fuscaldo & Lampl (57) ABSTRACT

Toolbar systems that can be used to mount tools and other items onto vehicles and other structures are disclosed. The toolbar systems may be installed on the underside of a truck cover in order to protect tools or other items during transport, and to allow easy access during use. The toolbar systems are adjustable to many different configurations in order to accommodate various types and sizes of tools and other articles. The toolbar systems are also usable with various types of clamping mechanisms that can releasably secure the tools and other items to the toolbar bases.

24 Claims, 9 Drawing Sheets

(56) References Cited

U.S. PATENT DOCUMENTS

| | | | | |
|---|---|---|---|---|
| 6,820,915 B2* | 11/2004 | Mack | | B60R 3/02 |
| | | | | 296/26.05 |
| 6,883,855 B2 | 4/2005 | Chverchko et al. | | |
| 6,929,303 B1* | 8/2005 | Sharples | | B60P 3/0255 |
| | | | | 296/100.1 |
| 7,052,220 B1* | 5/2006 | Jutila | | B60R 11/00 |
| | | | | 410/104 |
| 8,657,542 B2* | 2/2014 | Liu | | B60P 7/0815 |
| | | | | 410/104 |
| 8,857,882 B2* | 10/2014 | Daniels, Jr. | | B25H 3/02 |
| | | | | 297/188.09 |
| 9,173,489 B2* | 11/2015 | Sukman | | B65G 1/02 |
| 9,187,044 B2* | 11/2015 | Bonner | | B60R 9/00 |
| 9,682,733 B2* | 6/2017 | Krishnan | | B60J 7/1607 |
| 9,751,469 B1 | 9/2017 | Singer | | |
| 9,944,217 B2 | 4/2018 | Schroeder et al. | | |
| 10,072,788 B2* | 9/2018 | Chinn | | B60P 7/0815 |
| 10,118,472 B2 | 11/2018 | Lawson | | |
| 10,232,794 B1* | 3/2019 | Moore | | B60R 11/06 |
| 10,252,676 B2* | 4/2019 | Rossi | | B60R 7/02 |
| 10,328,778 B2* | 6/2019 | Aubrey | | B60J 7/141 |
| 10,384,522 B2* | 8/2019 | Yilma | | B60J 7/141 |
| 10,611,219 B2* | 4/2020 | Trinier | | B60J 7/1614 |
| 11,001,191 B2* | 5/2021 | Colovic | | B60P 7/0815 |
| 11,279,421 B1* | 3/2022 | Hoogendoorn | | B60R 9/06 |
| 11,292,382 B2* | 4/2022 | Johnson | | B60P 7/0807 |
| 11,529,854 B1* | 12/2022 | Williams | | B60R 9/065 |
| 11,713,002 B2* | 8/2023 | Shimp | | B60R 9/065 |
| | | | | 224/404 |
| 2003/0047958 A1* | 3/2003 | Yarbrough | | B60J 7/1621 |
| | | | | 296/100.06 |
| 2007/0110539 A1* | 5/2007 | Klinkman | | B60P 7/15 |
| | | | | 410/150 |
| 2009/0080995 A1* | 3/2009 | Peterson | | B60P 7/0815 |
| | | | | 410/104 |
| 2012/0187013 A1* | 7/2012 | Gapinski | | B25H 3/021 |
| | | | | 224/404 |
| 2014/0144958 A1* | 5/2014 | Sautter | | B60R 9/065 |
| | | | | 224/314 |
| 2017/0327052 A1* | 11/2017 | Singer | | B62D 33/023 |
| 2017/0355317 A1* | 12/2017 | Rossi | | B60R 11/06 |
| 2019/0283684 A1* | 9/2019 | Singer | | B60R 9/065 |
| 2020/0406730 A1* | 12/2020 | Fournier | | B60J 7/041 |
| 2021/0155088 A1* | 5/2021 | Amble | | B60J 7/14 |
| 2021/0155166 A1* | 5/2021 | Singer | | B60R 9/05 |
| 2023/0079942 A1* | 3/2023 | Singer | | B60P 1/6427 |
| | | | | 224/404 |

* cited by examiner

TOOLBAR SYSTEMS

CROSS-REFERENCE TO RELATED APPLICATION

This application claims the benefit of U.S. Provisional Patent Application No. 63/215,746 filed Jun. 28, 2021, which is incorporated herein by reference.

FIELD OF THE INVENTION

The present invention relates to toolbar systems for mounting tools and other articles onto vehicles and other structures.

BACKGROUND INFORMATION

Tools are often mounted on vehicles such as pickup trucks for secure transport and use.

SUMMARY OF THE INVENTION

The present invention provides toolbar systems that can be used to mount tools and other items onto vehicles and other structures. In one embodiment, the toolbar system may be installed on the underside of a truck cover in order to protect the tools or other items during transport, and to allow easy access during use. The toolbar systems are adjustable to many different configurations in order to accommodate various types and sizes of tools, etc. The toolbar systems are also usable with various types of clamping mechanisms that can releasably secure the tools and other items to the toolbar base.

An aspect of the present invention is to provide a toolbar system for attachment to a vehicle bed cover. The system comprises a toolbar support rail including a base structured and arranged for attachment to the vehicle bed cover and a central channel comprising at least one support slot, and at least one mechanical fastener slidably receivable within the at least one support slot structured and arranged to adjustably secure at least one clamp at a selected location along a length of the toolbar support rail.

Another aspect of the present invention is to provide a toolbar system comprising a toolbar support rail including a base structured and arranged for attachment to a support structure, a first support slot extending along a length of the toolbar support rail structured and arranged to slidingly receive a first slidable mechanical fastener, and a second support slot extending along the length of the toolbar support rail structured and arranged to slidingly receive a second slidable mechanical fastener.

A further aspect of the present invention is to provide a toolbar system kit comprising a toolbar support rail including a base structured and arranged for attachment to a support structure, a first support slot extending along a length of the toolbar support rail, and a second support slot extending along the length of the toolbar support rail, a plurality of first slidable mechanical fasteners slidably receivable in the first support slot structured and arranged for attachment to a first clamp, and a plurality of second slidable mechanical fasteners slidably receivable in the second support slot structured and arranged for attachment to a second clamp.

These and other aspects of the present invention will be more apparent from the following description.

DETAILED DESCRIPTION

Figure 1:
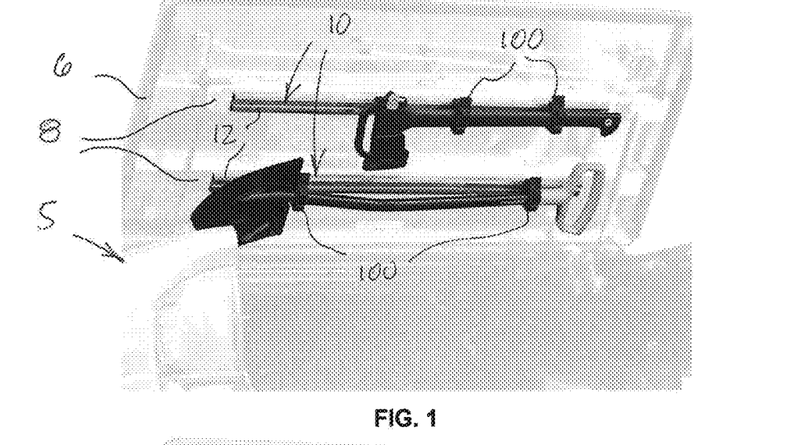
FIG. 1 illustrates a toolbar system of the present invention installed on the underside of a truck bed cover with tools attached to the toolbar system.
Figure 2:
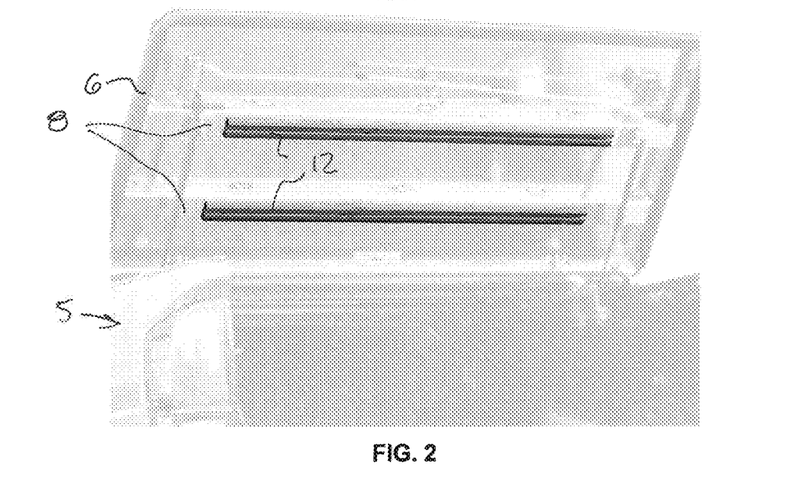
FIG. 2 illustrates a toolbar system of the present invention installed on the underside of a truck bed cover without tools attached to the toolbar system.

FIGS. 1-13 illustrate toolbar systems in accordance with an embodiment of the present invention. FIGS. 1 and 2 show a portion of a pickup truck bed 5 with a bed cover 6 including structural studs 8 to which toolbar systems 10 of the present invention are mounted. The toolbar systems 10 are installed on the underside of the truck bed cover 6. In the embodiment shown, the truck bed cover 6 is a commercially available cover sold under the designation DiamondBack. However, the toolbar systems 10 of the present invention may be installed on any other suitable type of truck cover or other support structure. In the embodiment shown, the toolbar systems 10 are installed on the underside of the DiamondBack cover on its structural studs 8. However, the toolbar systems 10 may be installed on any other suitable vehicles or structures. The toolbar systems 10 may be provided as aftermarket accessories and/or integrated into OEM vehicles, truck beds, truck bed covers and other structures.

The toolbar system 10 includes a toolbar base 12, two of which are shown in FIGS. 1 and 2. As shown in FIG. 1, the toolbar bases 12 may be used to secure tools such as the shovel and axe shown in FIG. 1 onto the underside of the truck bed cover 6. Clamps 100 are mounted on each toolbar base 12 to secure the tools. In the embodiment shown, the clamps 100 are commercially available clamps sold under the designation Quick Fist. However, any other suitable types of clamps and fasteners may be used in accordance with the present invention.

Figure 3:
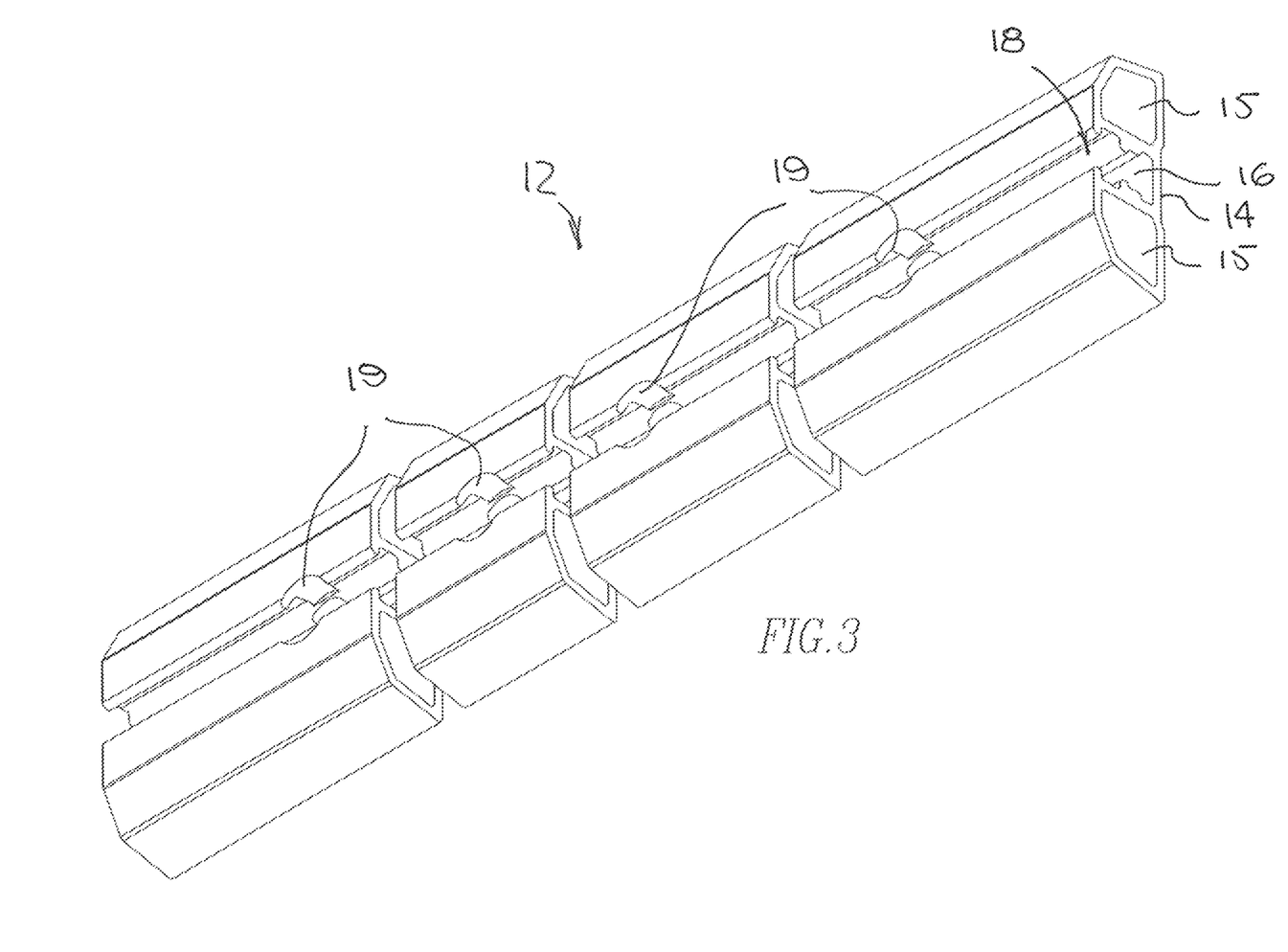
FIG. 3 is a broken isometric view of a toolbar support rail of a toolbar system of the present invention.
Figure 4:
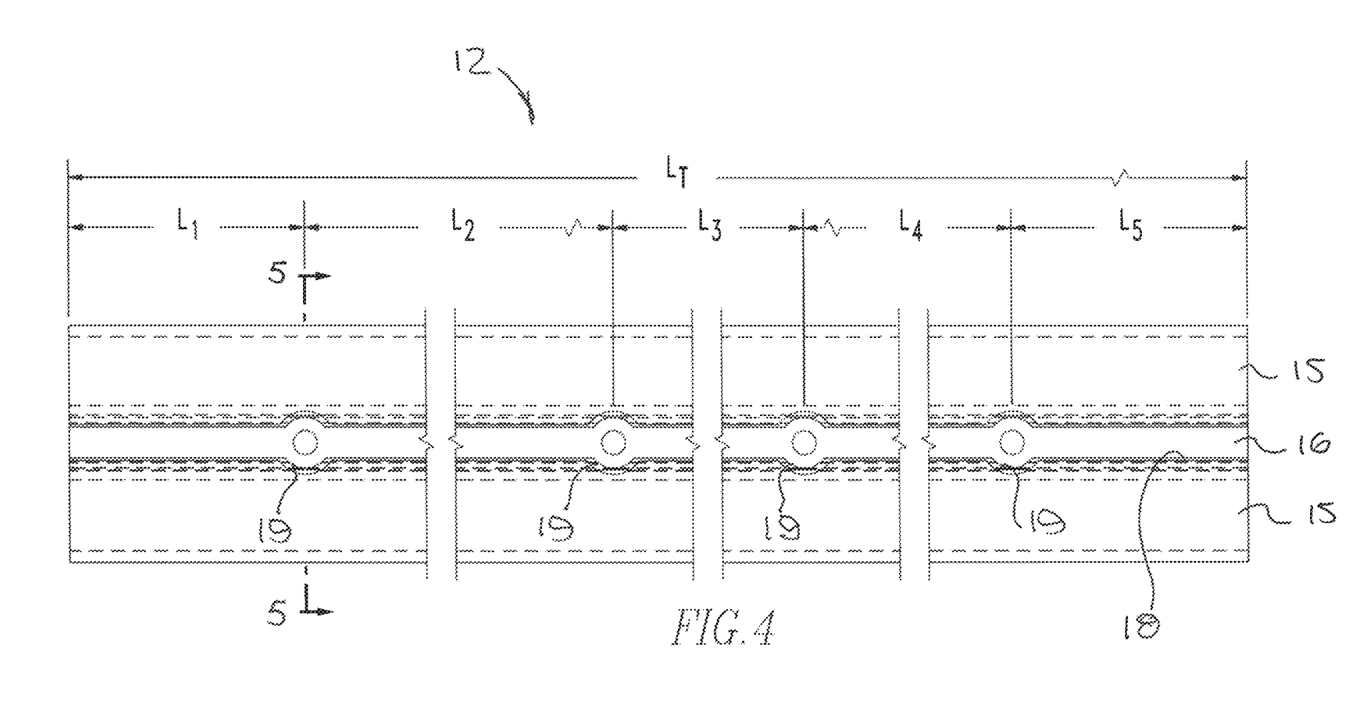
FIG. 4 is a broken front view of the toolbar support rail of FIG. 3.
Figure 5:
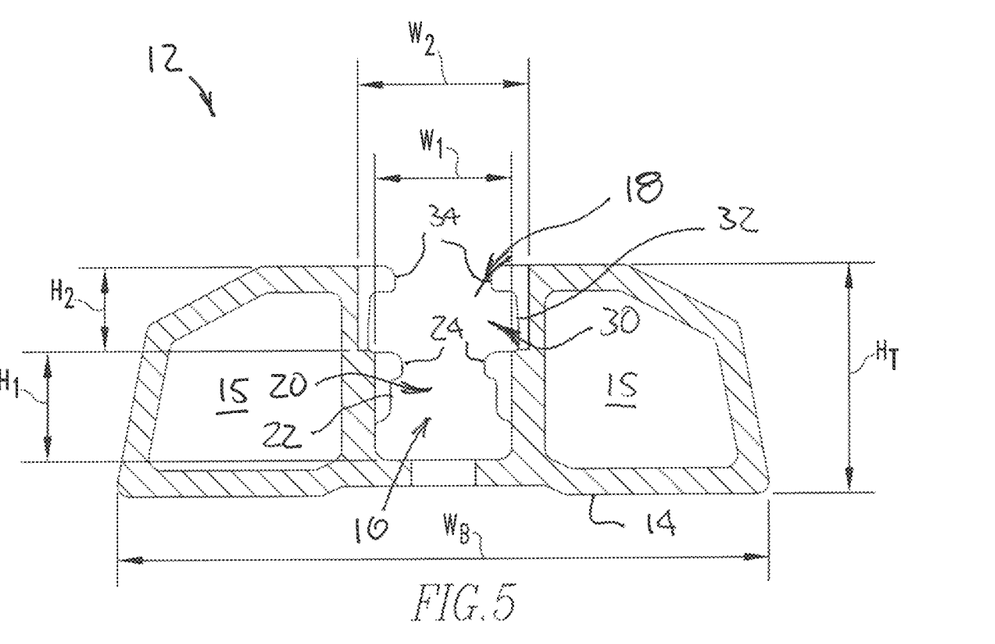
FIG. 5 is a sectional view of the toolbar support rail taken through section 5-5 of FIG. 4.

FIGS. 3-5 show details of the toolbar base 12. The toolbar base 12 includes a base 14, side channels 15 and a central channel 16 forming a central slot opening 18. Clearance holes 19 are provided in the central slot opening 18 at selected positions along the length of the toolbar support rails 12. The toolbar base 12 may face downward when installed on the underside of a truck cover 6, as shown in FIGS. 1 and 2, or may be installed at any suitable location or orientation. The toolbar base 12 may be made of any suitable material, such as aluminum and the like.

As shown in FIG. 4, the toolbar support rail 12 has a total length $L_T$ as well as intermediate lengths $L_1$, $L_2$, $L_3$, $L_4$ and $L_5$ measured along the length of the toolbar support rail 12 at its clearance holes 19. The total length $L_T$ may typically be from 12 to 96 inches, for example, from 18 to 72 inches, or from 24 to 60 inches, or from 36 to 48 inches, and may be about 42 inches in some embodiments. The intermediate lengths $L_1$ and $L_5$ on the ends of the toolbar support rail 12 may typically be from 1 to 3 inches, and the interior intermediate lengths $L_2$, $L_3$ and $L_4$ may typically be from 6 to 24 inches, or from 10 to 15 inches.

As shown in FIG. 5, the toolbar support rail 12 has a width at its base $W_B$, a narrow first width $W_1$ of the first fastener-receiving channel 22, and a wide second width $W_2$ of the second fastener-receiving channel 32. The base width $W_B$ may typically be from 1 to 4 inches, for example, from 1.5 to 3 inches, or about 2 inches. The narrow first width $W_1$ may typically be from 0.4 to 0.7 inch, for example, from 0.5 to 0.6 inch, or about 0.53 inch. The wide second width $W_2$ may typically be from 0.3 to 0.6 inch, for example, from 0.4 to 0.5 inch, or about 0.425 inch. The toolbar support rail 12 also has a total height $H_T$, a height $H_1$, of the first support slot 20, and a height $H_2$ of the second support slot 30. The total height $H_T$ may typically be from 0.4 to 0.8 inch, for example, from 0.5 to 0.7 inch, or about 0.6 inch. The first height $H_1$ may typically be from 0.2 to 0.5 inch, for example, from 0.3 to 0.4 inch, or about 0.337 inch. The second height $H_2$ may typically be from 0.15 to 0.35 inch, for example, from 0.2 to 0.3 inch, or about 0.26 inch.

Figure 6:
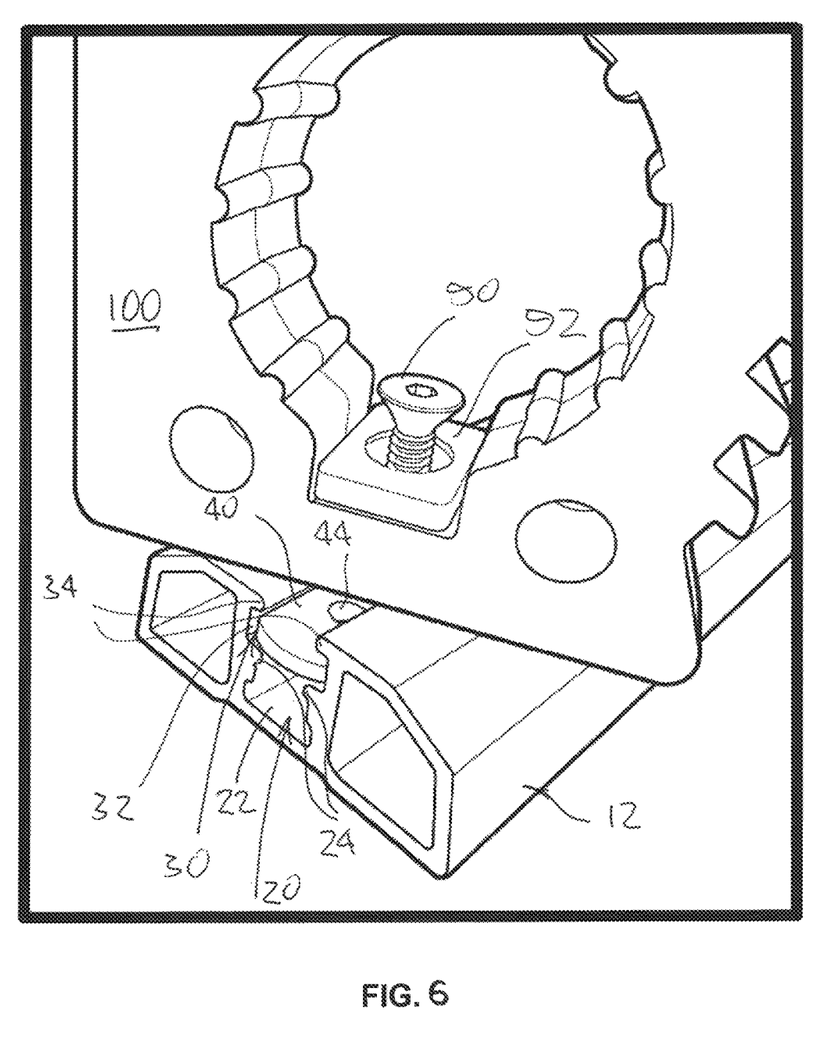
FIG. 6 is an isometric view of a toolbar system of the present invention with a clamp secured thereto.

As shown in FIGS. 5 and 6, the toolbar support rail 12 includes a first support slot 20 that is relatively narrow having opposing shoulders 24, and a second support slot 30 that is relatively wide having second opposing shoulders 34. The first support slot 20 and first opposing shoulders 24 form a first fastener-receiving channel 22. The second support slot 30 and the second opposing shoulders 34 form a second fastener-receiving channel 32. As more fully described below, various types of slidable nuts and hex bolts may be slidingly installed within the first fastener-receiving channel 22 or the second fastener-receiving channel 32.

FIG. 6 is an isometric view of the toolbar base 12 having a clamp 100 mounted thereon that may be moved along the length of the base 12 and secured at a desired position using slidable mechanical fasteners such as a slidable nut 40 and mounting bolt 90, as more fully described below. In the embodiment shown, the clamp 100 is a commercially available Quick Fist clamp.

Figure 7:
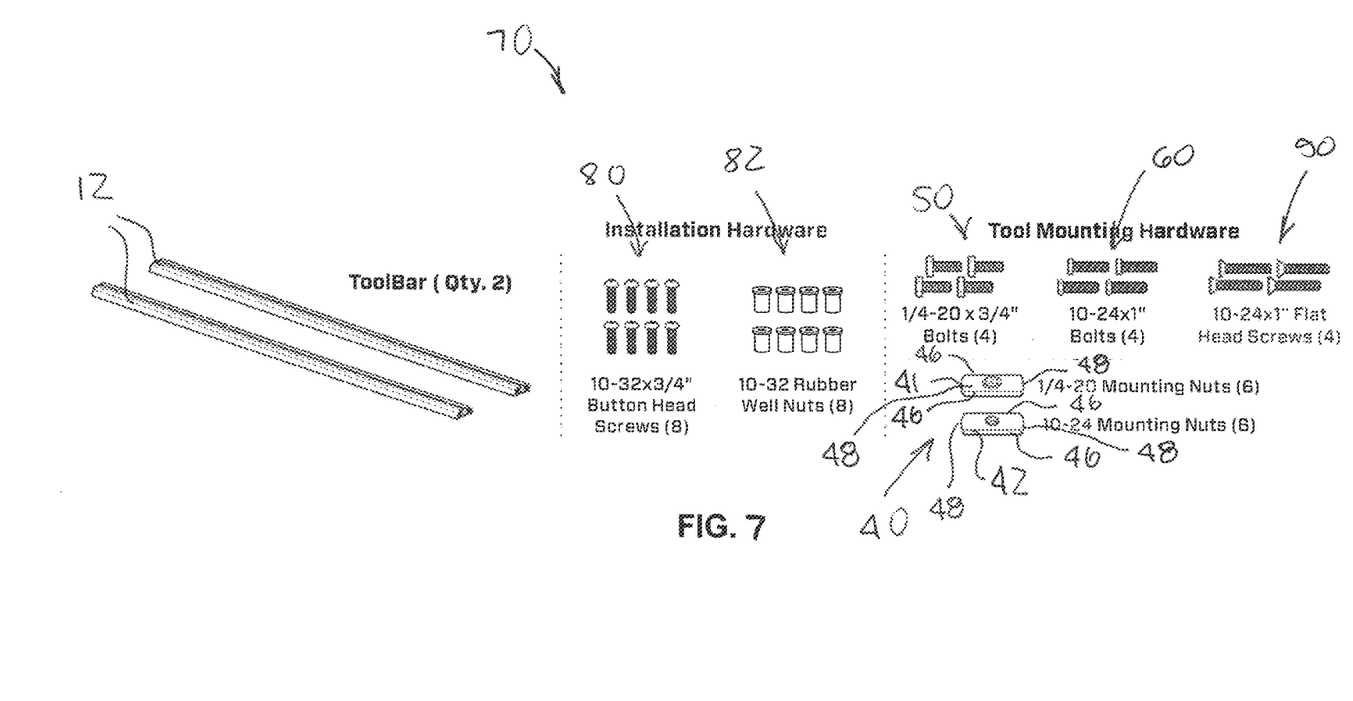
FIG. 7 illustrates components of a toolbar system kit of the present invention.

FIG. 7 illustrates an exemplary toolbar system kit 70 of the present invention including two toolbar support rails 12, a set of button head mounting screws 80 and a set of well nuts 82 that may be used for installing each toolbar base on a desired support structure, such as on the structural studs of a truck cover. FIG. 7 also illustrates toolbar mounting hardware that may be used for securing clamps to the toolbar bases. Two sets of slidable nuts 41 and 42 are provided. Each slidable nut 41 and 42 has opposing sidewalls 46 and opposing end noses 48. Two sets of slidable mechanical fasteners in the form of slidable hex head bolts of different sizes are provided, including large hex bolts 50 with relatively large hex heads 52 and small hex bolts 60 with relatively small hex heads 62. A set of flat head clamp screws 90 and clamp nuts 92 is also provided. Any suitable number of each type of hardware may be provided as part of the tool bar system kit 70. Various types of clamps and hold-down mechanisms can be threaded into the holes of the slidable nuts 41 and 42 for securement to the toolbar base 12. Similarly, various types of clamps and hold-down mechanisms can be threaded onto the threads of the slidable hex head bolts 50 and 60 for securement to the toolbar base 12. In addition, multiple types of the slidable nuts 40 and hex bolts 50 and 60 may be installed on the toolbar support rail 12 during use.

Figure 8:
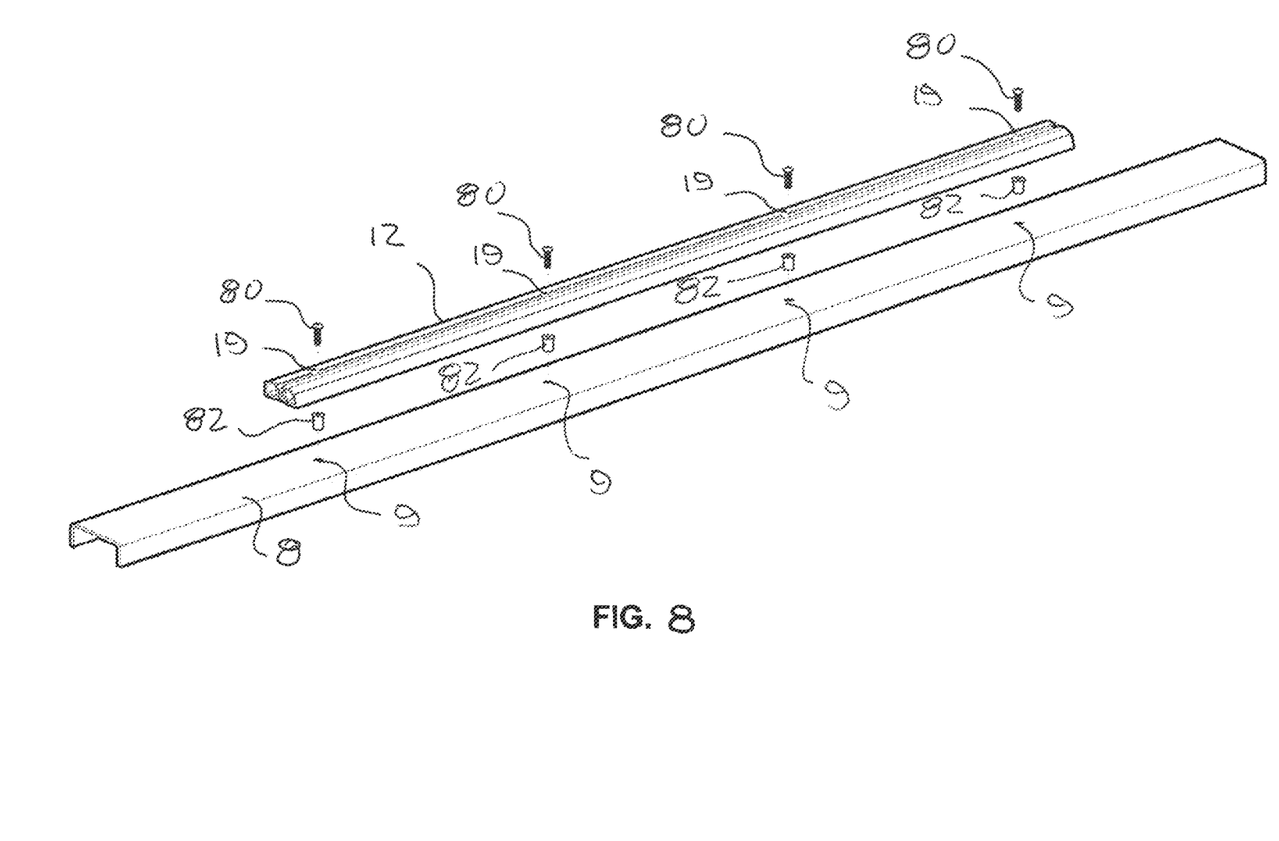
FIG. 8 is an exploded isometric view of a structural stud to which a toolbar support rail may be secured with mounting hardware.
Figure 9:
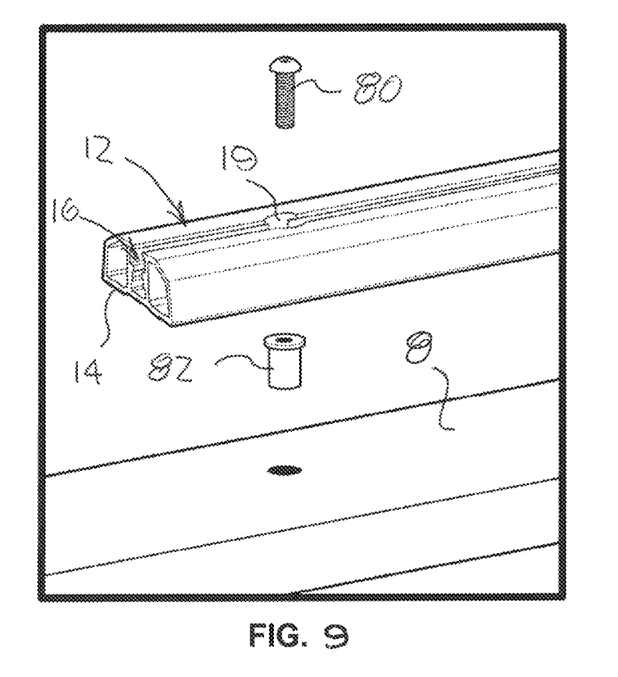
FIGS. 9 and 10 are exploded isometric views of portions of a structural stud and toolbar support rail illustrating sequential steps of installing the toolbar support rail on the structural stud with mounting hardware.
Figure 10:
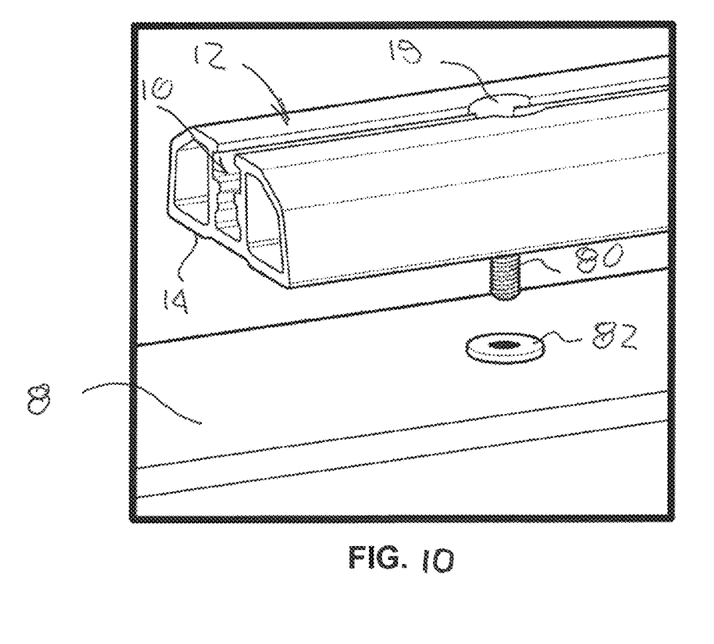
Figure 11:
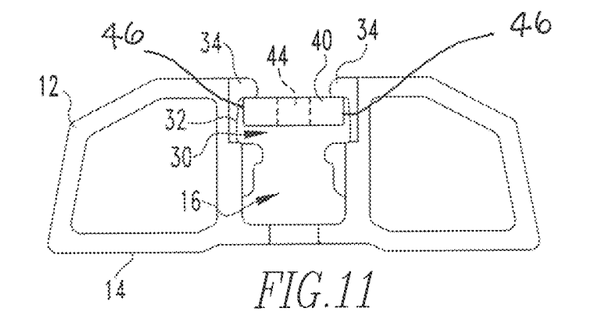
FIG. 11 is an end view of a toolbar support rail with a slidable nut installed in a receiving channel of the toolbar support rail.
Figure 12:
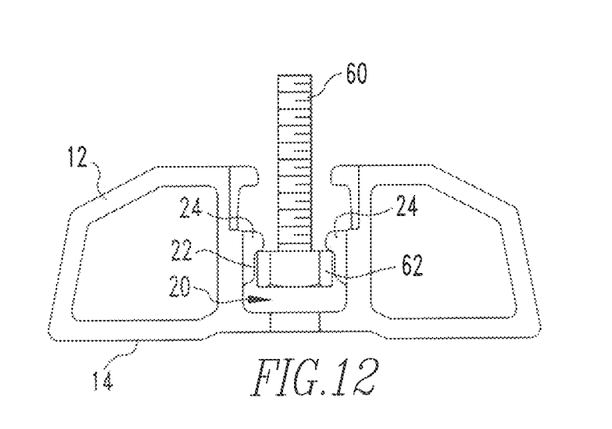
FIG. 12 is an end view of a toolbar support rail with a hex bolt installed in a first fastener-receiving channel of the toolbar support rail.
Figure 13:
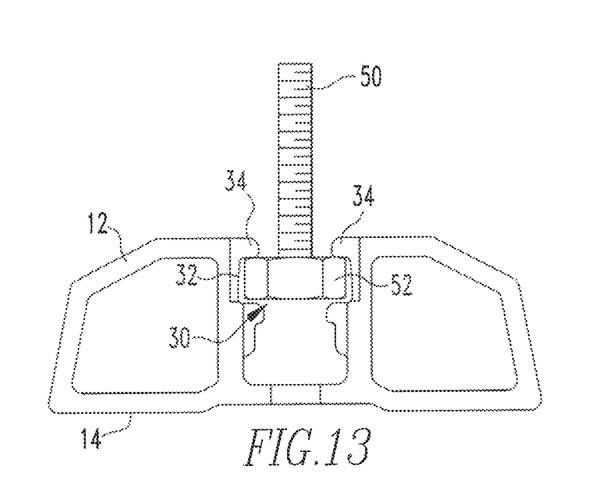
FIG. 13 is an end view of a toolbar support rail with another hex bolt installed in a second fastener-receiving channel of the toolbar support rail.

FIG. 8 is an isometric view illustrating installation of a toolbar base 12 on a structural stud 8. While a separate structural stud 8 is shown in FIG. 8, it is to be understood that any other suitable type of support structure may be used. FIGS. 9 and 10 are magnified views showing details of the installation. Mounting holes 9 are provided in the structural stud 8 that receive well nuts 82 that may be made of rubber, plastic or any other suitable material. A button head mounting screw 80 is inserted through the hole 19 in the toolbar base 12 and is threaded into the well nut 82. As most clearly shown in FIGS. 4, 6 and 12, when the button head mounting screw 80 is inserted through the clearance hole 19 of the base 12, its head contacts the bottom of the central channel 16 running along the length of the base 12.

As shown most clearly in FIGS. 3, 6 and 10, the central channel 16 is structured to slidingly receive the mounting nuts to which the clamps may be secured, e.g., the Quick Fist clamp shown in FIG. 6. The first fastener-receiving channel 22 that receives the slidable mechanical fasteners has a relatively narrow width in comparison with the second fastener-receiving channel 32 having a larger width. The second larger channel 32 may receive the slidable nuts 40 as shown in FIG. 6, or may receive other fastening means such as the slidable hex heads of the larger set of bolts shown in FIG. 7. The first smaller channel 22 may receive slidable mechanical fasteners, such as the hex heads of the smaller bolts shown in FIG. 7.

The tool mounting hardware shown in FIG. 7 may be used to secure clamps at desired locations along the length of the toolbar base. When the slidable nuts 40 are used, they can be slid in the second larger channel 32 of the base to desired locations. Similarly, when the larger set of slidable hex head bolts 50 shown in FIG. 7 are used, their heads may be slid in the second larger channel 32 to desired positions along the length of the toolbar base 12. The width of the second larger channel 32 may be sized to accommodate the opposing sidewalls 46 of the slidable bolts 40 and/or the hex heads of the larger bolts 50 and to prevent the nuts or bolts from rotating when installed in the second channel 32. In a similar manner, the smaller set of bolts 60 shown in FIG. 7 may be installed on the base by sliding their hex heads along the first smaller channel 22 to desired locations along the length of the toolbar base 12. The width of the second smaller channel portion is sized such that the hex heads of the smaller set of bolts prevent rotation of the bolts when installed in the toolbar base.

When installing toolbar systems of the present invention on a support structure such as the structural studs of a truck cover, the following instructions may be followed: determine where the toolbar is to be mounted, for example, centered on the structural studs of the DiamondBack Cover; open the desired panel of the DiamondBack Cover and pull the gas spring off the access panel ball stud by flipping the quick-release tab outward to the open position—if necessary, disengage the safety catch, and be sure to reattach properly; fold the panel all the way over and rest on the opposite panel—this allows for a flat workspace—if a top-mounted accessory prevents the panel from being folded completely over, this process can be completed with the cover closed or in the open position; place the toolbar base in the desired location and mark the four mounting holes; place the toolbar base off to the side and drill each of these marks with the ⅜" drill bit; once the holes are drilled, locate four of the rubber well nuts—place one of these in each of the drilled holes—well nuts have a grip range of 0.015"-0.188"—do not mount the toolbar base using the well nuts on material outside of this thickness; place the toolbar base on top of the well nuts and align the holes; locate the 10-32 button head screws from the hardware kit and ⅛" hex key—tighten the screws through the toolbar base until it is secured tightly; and repeat previous steps for the second toolbar base, unless mounting elsewhere.

The toolbar base 12 may be compatible with commercially available Quick Fist clamps 100 and the like. To install the clamps 100, locate the included #10-24 flat head screw and #10-24 mounting nut from the hardware kit. Insert screw into the plastic washer (included in Quick Fist packaging) and Quick Fist clamp. Partially thread the mounting nut onto the screw. Slide the mounting nut into the end of the toolbar base and tighten the screw at the desired location. No additional tool mounting hardware may be required. The toolbar systems enable many different tools and items to be easily mounted.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A toolbar system comprising:
    a vehicle bed cover having an underside; and
    a toolbar support rail comprising a base attached to the underside of the vehicle bed cover comprising a channel comprising at least one support slot structured and arranged to slidably receive at least one mechanical fastener along a length of the toolbar support rail, wherein the vehicle bed cover is movable from a closed position to an open position in which the toolbar support rail remains attached to the underside of the vehicle bed cover, the toolbar support rail is integrally formed with the vehicle bed cover, and the integrally formed toolbar support rail comprises a structural stud of the vehicle bed cover.

2. The toolbar attachment system of claim 1, wherein the vehicle bed cover comprises a pickup truck bed cover.

3. The toolbar attachment system of claim 2, wherein the pickup truck bed cover is pivotally mounted adjacent to the pickup truck bed and is movable from the open position in which the toolbar system is accessible for attaching or removing tools from the toolbar system to the closed position in which the toolbar system is contained inside the bed of the pickup truck.

4. The toolbar system of claim 1, wherein the channel comprises:
    a first support slot extending along a length of the toolbar support rail structured and arranged to slidably receive a first slidable mechanical fastener; and
    a second support slot extending along the length of the toolbar support rail structured and arranged to slidingly receive a second slidable mechanical fastener.

5. The toolbar system of claim 4, wherein the first support slot comprises a first fastener-receiving channel in which the first slidable mechanical fastener is free to slide, and first opposing shoulders structured and arranged to slidably retain the first slidable mechanical fastener in the first support slot.

6. The toolbar system of claim 4, wherein the second support slot comprises a second fastener-receiving channel in which the second slidable mechanical fastener is free to slide, and second opposing shoulders structured and arranged to slidably retain the second slidable mechanical fastener in the second support slot.

7. The toolbar system of claim 4, wherein the first and second support slots are vertically aligned along a height of the toolbar support rail.

8. The toolbar system of claim 7, wherein the first and second support slots form a central channel extending along the length of the toolbar support rail.

9. The toolbar system of claim 4, wherein the first support slot comprises a first fastener-receiving channel having a first width selected to allow the first slidable mechanical fastener to slide within the first fastener-receiving channel and to substantially prevent rotation of the first slidable mechanical fastener, and the second support slot comprises a second fastener-receiving channel having a second width selected to allow the second slidable mechanical fastener to slide within the second fastener-receiving channel and to substantially prevent rotation of the second slidable mechanical fastener.

10. The toolbar system of claim 9, wherein the first and second widths are different.

11. The toolbar system of claim 10, wherein the first support slot is adjacent to the base, the second support slot is adjacent to a central slot opening of the toolbar support rail, and the first width is smaller than the second width.

12. The toolbar system of claim 4, wherein at least one of the first slidable mechanical fastener and the second slidable mechanical fastener comprise a slidable nut inserted in the first or second support slot having a threaded hole extending therethrough structured and arranged to threadingly engage a clamp nut.

13. The toolbar system of claim 12, wherein the slidable nut is substantially prevented from rotating within the first or second support slot.

14. The toolbar system of claim 4, wherein at least one of the first slidable mechanical fastener and the second slidable mechanical fastener comprises a hex bolt comprising a hex head inserted in the first or second support slot.

15. The toolbar system of claim 4, wherein the first slidable mechanical fastener comprises a first hex bolt comprising a first hex head inserted in the first support slot, and the second slidable mechanical fastener comprises a second hex bolt comprising a second hex head inserted in the second support slot.

16. The toolbar system of claim 15, wherein the first hex head is slidable in a first fastener-receiving channel of the first support slot and is substantially prevented from rotating within the first fastener-receiving channel, and the second hex head is slidable in a second fastener-receiving channel of the second support slot and is substantially prevented from rotating within the second fastener-receiving channel.

17. The toolbar system of claim 16, wherein the first hex head has a smaller width than the second hex head.

18. The toolbar system of claim 1, further comprising a mechanical fastener inserted in the channel and a clamp secured to the mechanical fastener.

19. The toolbar system of claim 18, wherein the clamp is secured by threaded engagement with the mechanical fastener.

20. A toolbar system comprising:
a pickup truck bed cover having an underside; and
a toolbar support rail comprising a base attached to the underside of the pickup truck bed cover comprising a channel comprising at least one support slot structured and arranged to slidably receive at least one mechanical fastener along a length of the toolbar support rail, wherein the pickup truck bed cover is movable from a closed position to an open position in which the toolbar support rail remains attached to the underside of the pickup truck bed cover, and the toolbar support rail is attached to a structural stud located on the underside of the pickup truck bed cover by at least one mounting screw extendable through the base of the toolbar support rail into the structural stud.

21. The toolbar system of claim 20, wherein the channel comprises:
a first support slot extending along a length of the toolbar support rail structured and arranged to slidingly receive a first slidable mechanical fastener; and
a second support slot extending along the length of the toolbar support rail structured and arranged to slidingly receive a second slidable mechanical fastener.

22. The toolbar system of claim 21, wherein:
the first support slot comprises a first fastener-receiving channel in which the first slidable mechanical fastener is free to slide, and first opposing shoulders structured and arranged to slidably retain the first slidable mechanical fastener in the first support slot; and
the second support slot comprises a second fastener-receiving channel in which the second slidable mechanical fastener is free to slide, and second opposing shoulders structured and arranged to slidably retain the second slidable mechanical fastener in the second support slot.

23. The toolbar system of claim 21, wherein the first and second support slots are vertically aligned along a height of the toolbar support rail.

24. The toolbar system of claim 23, wherein the first and second support slots form a central channel extending along the length of the toolbar support rail.

* * * * *